US008553619B2

(12) United States Patent
Herzog et al.

(10) Patent No.: US 8,553,619 B2
(45) Date of Patent: Oct. 8, 2013

(54) METHOD AND A SYSTEM FOR TIME SYNCHRONISATION BETWEEN A CONTROL CENTRE AND SEVERAL TRANSMITTERS

(75) Inventors: Norman Herzog, Berlin (DE); Guenther Zurek-Terhardt, Schoeneiche (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 227 days.

(21) Appl. No.: 13/002,210

(22) PCT Filed: Jun. 23, 2009

(86) PCT No.: PCT/EP2009/004508
§ 371 (c)(1),
(2), (4) Date: Feb. 25, 2011

(87) PCT Pub. No.: WO2010/000407
PCT Pub. Date: Jan. 7, 2010

(65) Prior Publication Data
US 2011/0141975 A1    Jun. 16, 2011

(30) Foreign Application Priority Data

Jul. 4, 2008   (DE) .................. 10 2008 031 796
Nov. 11, 2008 (DE) .................. 10 2008 056 703

(51) Int. Cl.
*H04W 4/00* (2009.01)

(52) U.S. Cl.
USPC ........... 370/328; 370/329; 370/338; 370/350; 370/509; 370/235; 370/503; 370/349; 370/516; 370/278

(58) Field of Classification Search
USPC ............. 370/328, 329, 338, 350, 509, 235, 370/503, 349, 516, 278
See application file for complete search history.

(56) References Cited

U.S. PATENT DOCUMENTS

| 5,216,503 A | 6/1993 | Paik et al. |
| 5,506,844 A | 4/1996 | Rao |

(Continued)

FOREIGN PATENT DOCUMENTS

| DE | 199 60 295 | 6/2001 |
| DE | 196 17 293 | 11/2001 |

(Continued)

OTHER PUBLICATIONS

Lee et al., "ATSC Terrestrial Digital Television Broadcasting Using Single Frequency Networks", XP-002556814, ETRI Journal, vol. 26, No. 2, Apr. 2004, pp. 92-100.

(Continued)

*Primary Examiner* — Nicholas Taylor
*Assistant Examiner* — Padma Mundur
(74) *Attorney, Agent, or Firm* — Fitzpatrick, Cella, Harper & Scinto

(57) ABSTRACT

Time synchronization between a control center and transmitters in a single frequency network is provided by generating and receiving a first reference time signal with a high time and frequency accuracy in a short and long time horizon and a second reference time signal supplied to the control center with a low time and frequency accuracy in the short time horizon and a high time and frequency accuracy in the long time horizon. A transport data stream is generated and supplied to the transmitters with a time-variable data rate through the control center corresponding to a frequency of the second reference time signal. Time displacement of the transport data stream received from the control center is performed by a respective transmitter until the data packets of the transport data stream each containing a transmission time are transmitted at a correct transmission time.

11 Claims, 4 Drawing Sheets

(56) References Cited

U.S. PATENT DOCUMENTS

| | | | |
|---|---|---|---|
| 5,614,914 A | 3/1997 | Bolgiano et al. | |
| 5,835,493 A | 11/1998 | Magee et al. | |
| 5,903,574 A | 5/1999 | Lyons | |
| 5,966,120 A | 10/1999 | Arazi et al. | |
| 6,005,605 A | 12/1999 | Kostreski et al. | |
| 6,088,337 A | 7/2000 | Eastmond et al. | |
| 6,118,797 A | 9/2000 | O'Shea | |
| 6,130,898 A | 10/2000 | Kostreski et al. | |
| 6,192,070 B1 | 2/2001 | Poon et al. | |
| 6,269,092 B1 | 7/2001 | Schilling | |
| 6,313,885 B1 | 11/2001 | Patel et al. | |
| 6,324,186 B1 | 11/2001 | Mahn | |
| 6,335,766 B1 | 1/2002 | Twitchell et al. | |
| 6,414,720 B1 | 7/2002 | Tsukidate et al. | |
| 6,477,180 B1 | 11/2002 | Aggarwal et al. | |
| 6,480,236 B1 | 11/2002 | Limberg | |
| 6,496,477 B1 | 12/2002 | Perkins et al. | |
| 6,507,618 B1 | 1/2003 | Wee et al. | |
| 6,631,491 B1 | 10/2003 | Shibutani et al. | |
| 6,640,239 B1 | 10/2003 | Gidwani | |
| 6,721,337 B1 | 4/2004 | Kroeger et al. | |
| 6,727,847 B2 | 4/2004 | Rabinowitz et al. | |
| 6,728,467 B2 | 4/2004 | Oshima | |
| 6,744,789 B1 | 6/2004 | Michener | |
| 6,772,434 B2 | 8/2004 | Godwin | |
| 6,801,499 B1 | 10/2004 | Anandakumar et al. | |
| 6,804,223 B2 | 10/2004 | Hoffmann et al. | |
| 6,816,204 B2 | 11/2004 | Limberg | |
| 6,861,964 B2 | 3/2005 | Breti et al. | |
| 6,862,707 B2 | 3/2005 | Shin | |
| 6,879,720 B2 | 4/2005 | Sarachik et al. | |
| 6,930,983 B2 | 8/2005 | Perkins et al. | |
| 6,934,312 B2 | 8/2005 | Takeuchi et al. | |
| 6,996,133 B2 | 2/2006 | Bretl et al. | |
| 7,110,048 B2 | 9/2006 | Weiss | |
| 7,111,221 B2 | 9/2006 | Birru et al. | |
| 7,197,685 B2 | 3/2007 | Limberg | |
| 7,310,354 B2 | 12/2007 | Fimoff et al. | |
| 7,324,545 B2 | 1/2008 | Chuah et al. | |
| 7,336,646 B2 | 2/2008 | Muller | |
| 7,349,675 B2 | 3/2008 | Karr et al. | |
| 7,382,838 B2 | 6/2008 | Peting | |
| 7,496,094 B2 | 2/2009 | Gopinath et al. | |
| 7,532,677 B2 | 5/2009 | Simon | |
| 7,532,857 B2 | 5/2009 | Simon | |
| 7,539,247 B2 | 5/2009 | Choi et al. | |
| 7,551,675 B2 | 6/2009 | Kroeger | |
| 7,554,912 B2 | 6/2009 | Rodriguez-Sanchez et al. | |
| 7,558,279 B2 | 7/2009 | Hwang et al. | |
| 7,564,905 B2 | 7/2009 | Park et al. | |
| 7,593,474 B2 | 9/2009 | Jeong et al. | |
| 7,599,348 B2 | 10/2009 | Kang et al. | |
| 7,667,780 B2 | 2/2010 | Weiss | |
| 7,668,250 B2 | 2/2010 | Limberg | |
| 7,672,399 B2 | 3/2010 | Simon | |
| 7,702,337 B2 | 4/2010 | Vare et al. | |
| 7,715,489 B2 | 5/2010 | Zeng | |
| 7,715,491 B2 | 5/2010 | Yu et al. | |
| 7,733,819 B2 | 6/2010 | Lee et al. | |
| 7,738,582 B2 | 6/2010 | Simon | |
| 7,773,684 B2 | 8/2010 | Jeong et al. | |
| 7,779,327 B2 | 8/2010 | Lee et al. | |
| 7,783,316 B1 | 8/2010 | Mitchell | |
| 7,801,181 B2 | 9/2010 | Song et al. | |
| 7,804,909 B2 | 9/2010 | Choi et al. | |
| 7,822,134 B2 | 10/2010 | Kim et al. | |
| 7,822,139 B2 | 10/2010 | Simon | |
| 7,830,974 B2 | 11/2010 | Choi et al. | |
| 7,852,961 B2 | 12/2010 | Chang et al. | |
| 7,856,590 B2 | 12/2010 | Kim et al. | |
| 7,890,047 B2 | 2/2011 | Kidd et al. | |
| 7,933,351 B2 | 4/2011 | Kim et al. | |
| 7,953,160 B2 | 5/2011 | Gordon et al. | |
| 8,009,662 B2 | 8/2011 | Lee et al. | |
| 2001/0017849 A1 | 8/2001 | Campanella et al. | |
| 2002/0085548 A1 | 7/2002 | Ku et al. | |
| 2002/0170060 A1 | 11/2002 | Lyman | |
| 2003/0053493 A1 | 3/2003 | Graham Mobley et al. | |
| 2003/0099303 A1 | 5/2003 | Birru et al. | |
| 2003/0100267 A1 | 5/2003 | Itoh et al. | |
| 2003/0206596 A1 | 11/2003 | Carver et al. | |
| 2005/0013249 A1 | 1/2005 | Kong et al. | |
| 2005/0044475 A1 | 2/2005 | Yedidia et al. | |
| 2005/0046600 A1 | 3/2005 | Bretl et al. | |
| 2005/0084023 A1 | 4/2005 | Bott et al. | 375/260 |
| 2005/0147186 A1 | 7/2005 | Funamoto et al. | |
| 2005/0207416 A1 | 9/2005 | Rajkotia | |
| 2005/0238100 A1 | 10/2005 | Hsiao et al. | |
| 2005/0249301 A1 | 11/2005 | Jeong et al. | |
| 2006/0002464 A1 | 1/2006 | Choi et al. | |
| 2006/0050770 A1 | 3/2006 | Wallace et al. | |
| 2006/0088023 A1* | 4/2006 | Muller | 370/350 |
| 2006/0126556 A1 | 6/2006 | Jiang et al. | |
| 2006/0211436 A1 | 9/2006 | Paila et al. | |
| 2006/0245516 A1 | 11/2006 | Simon | |
| 2007/0066272 A1 | 3/2007 | Vassiliou et al. | |
| 2007/0074267 A1* | 3/2007 | Clerget et al. | 725/136 |
| 2007/0091857 A1* | 4/2007 | Elstermann | 370/338 |
| 2007/0143810 A1 | 6/2007 | Yousef | |
| 2007/0174880 A1 | 7/2007 | Fite et al. | |
| 2007/0230460 A1 | 10/2007 | Jeong et al. | |
| 2008/0056219 A1 | 3/2008 | Venkatachalam | |
| 2008/0175148 A1 | 7/2008 | Todd et al. | |
| 2008/0181112 A1* | 7/2008 | Beck et al. | 370/235 |
| 2008/0205215 A1 | 8/2008 | Kikuchi et al. | |
| 2008/0209464 A1 | 8/2008 | Wright-Riley | |
| 2008/0211969 A1 | 9/2008 | Simon et al. | |
| 2008/0247442 A1 | 10/2008 | Orlik et al. | |
| 2008/0259835 A1 | 10/2008 | Venkatachalam et al. | |
| 2008/0273698 A1 | 11/2008 | Manders et al. | |
| 2009/0003432 A1 | 1/2009 | Liu et al. | |
| 2009/0013356 A1 | 1/2009 | Doerr et al. | |
| 2009/0016435 A1 | 1/2009 | Brandsma et al. | |
| 2009/0034442 A1 | 2/2009 | Song et al. | |
| 2009/0040962 A1 | 2/2009 | Oger et al. | |
| 2009/0100459 A1 | 4/2009 | Riedl et al. | |
| 2009/0193487 A1 | 7/2009 | Simon | |
| 2009/0201997 A1 | 8/2009 | Kim et al. | |
| 2009/0225872 A1 | 9/2009 | Simon | |
| 2009/0228764 A1 | 9/2009 | Lee et al. | |
| 2009/0228765 A1 | 9/2009 | Lee et al. | |
| 2009/0252266 A1 | 10/2009 | Heinemann et al. | 375/362 |
| 2009/0265751 A1 | 10/2009 | Limberg | |
| 2009/0293086 A1 | 11/2009 | Lutterbach et al. | |
| 2010/0023972 A1 | 1/2010 | Summers et al. | |
| 2010/0150182 A1 | 6/2010 | Noronha, Jr. | |
| 2010/0254449 A1 | 10/2010 | Rusch-Ihwe | |
| 2011/0170015 A1 | 7/2011 | Kim et al. | |
| 2011/0230202 A1 | 9/2011 | Wood et al. | |

FOREIGN PATENT DOCUMENTS

| | | |
|---|---|---|
| DE | 101 12 773 A1 | 9/2002 |
| DE | 10 2006 015 393 A1 | 10/2007 |
| DE | 10 2007 012 465 | 5/2008 |
| EP | 0 837 609 | 4/1998 |
| EP | 0 926 894 | 6/1999 |
| EP | 1 079 631 A1 | 2/2001 |
| EP | 1 670 150 | 6/2006 |
| EP | 1 753 249 | 2/2007 |
| EP | 1 950 962 A1 | 7/2008 |
| EP | 1 965 386 A1 | 9/2008 |
| EP | 1 965 389 A2 | 9/2008 |
| GB | 2 399 719 | 9/2004 |
| WO | WO 02/03728 | 1/2002 |
| WO | WO 03/009590 | 1/2003 |
| WO | WO 03/045064 | 5/2003 |
| WO | 2004/062183 A1 | 7/2004 |
| WO | 2004/062283 | 7/2004 |
| WO | 2006/046107 A1 | 5/2006 |
| WO | 2006/066617 | 6/2006 |
| WO | 2006/084361 A1 | 8/2006 |
| WO | 2007/046672 | 4/2007 |
| WO | 2007/114653 | 10/2007 |

| | | |
|---|---|---|
| WO | 2008/042694 A1 | 4/2008 |
| WO | 2008/117981 A1 | 10/2008 |
| WO | 2009/016175 A1 | 2/2009 |

OTHER PUBLICATIONS

"ATSC Digital Television Standard (Annex D), RF/Transmission Systems Characteristics", Advanced television Systems Committee, Sep. 16, 1995, pp. 46-60.

ATSC Digital Television Standard (A/53), "Annex D: RF/Transmission Systems Characteristics", Sep. 16, 1995, pp. 46-60.

ATSC Digital Television Standard (A/53) Revision E, Advanced Television Systems Committee, Dec. 27, 2005.

"ATSC-Mobile DTV Standard, Part 3-Service Multiplex and Transport Subsystem Characteristics", Advanced Television Systems Committee, Inc., Document A/153 Part 3:2009, Oct. 15, 2009, pp. 14-25.

ATSC Recommended Practice: Design of Synchronized Multiple Transmitter Networks (A/111), Advanced Television Systems Committee, Sep. 3, 2004.

ATSC Standard: Synchronization Standard for Distributed Transmission (A/110), Advanced Television Systems Committee, Jul. 14, 2004.

ATSC Standard: Synchronization Standard for Distributed Transmission, Revision A (A/110A), Advanced Television Systems Committee, Jul. 19, 2005.

ATSC Standard: Synchronization Standard for Distributed Transmission, Revision B (A/110B), Advanced Television Systems Committee (Dec. 24, 2007).

ATSC Technology Group Report: DTV Signal Reception and Processing Considerations, Doc. T3-600r4, Advanced Television Systems Committee, Sep. 18, 2003.

Battisa, "Spectrally Efficient High Data Rate Waveforms for the UFO SATCOM Channel", Military Communications Conference, MILCOM 98, Proceedings, Oct. 18-21, 1998, pp. 134-139, IEEE vol. 1.

Citta, R., et al., "ATSC Transmission System: VSB Tutorial", Zenith Electronics Corporation, Symposium Handout, Montreuz Symposium, Jun. 12, 1997.

"Digital Video Broadcasting (DVB); DVB Mega-Frame for Single Frequency Network (SFN) Synchronization", European Broadcasting Union; eTSI TS 101 191 v1.4.1, Jun. 2004.

"European Broadcasting Union Union Europeenne de Radio-Television Digital Video Broadcasting (DVB); Specification for Service Information (SI) in DVB systems; ETS 300 468", ETSI Standards, Lis, Sophia Antipolis Cedex, France, vol. BC, Second Edition, Jan. 1, 1997, pp. 1-72.

Lecture 4: Digital Television the DVB transport stream, obtained from http://www.abo.fi/~jbjorkqv/digitv/lect4.pdt (last visited May 4, 2006).

Lee, Y., et al., "ATSC Terrestrial Digital Television Broadcasting Using Single Frequency Networks", ETRI Journal, Apr. 2004, pp. 92-100, vol. 26, No. 2.

Owen, H., "Proposed Modifications to ATSC Digital Television Standard to Improve Performance in the Face of Dynamic Multipath for Both Fixed and Mobile Operation", Sarnoff Corporation, Apr. 2, 2001.

Patel, C. B., et al., "Proposal to ATSC Subcommittee T3/S9 to Provide 8-VSB With a Repetitive-PN1023 Signal for Rapidly and Reliably Initializing Tracking in an Adaptive Equalizer Despite Adverse Multipath Conditions", Apr. 12, 2001.

Proposal for Enhancement of ATSC RF Transmission System (Revision to A/53), submitted by Samsung, Draft ver. 1.0, Sep. 16, 2004.

Raghunandan, K., "Satellite Digital Audio Radio Service (SDARS) System Architecture and Receiver Review", IEEE, Oct. 27, 2005.

Vogel, W. J., et al., "Propagation Effects and Satellite Radio Design", Paper No. 1445, Maastricht Exhibition and Congress Centre (MECC), Aug. 17-24, 2002.

Wang, "A New Implementation of Single Frequency Network Based on DMB-T", 2004 International Conference on Communications, Circuits and Systems (2004 ICCCAS), Jun. 27-29, 2004, pp. 246-249, vol. 1.

Wang, X., et al., "Transmitter Identification in Distributed Transmission Network and its Applications in Position Location and a New Data Transmission Scheme", NAB Broadcast Engineering Conference, Apr. 16-21, 2005, pp. 511-520.

Whitaker, J. C., "Standard Handbook of Video and Television Engineering", Chapter 17.2 "ATSC DTV Received Systems", 2000, pp. 17-63 to 17-99.

"Universal Mobile Telecommunication Systems (UMTS); Introduction of the Multimedia Broadcast/Multicast Service (MBMS) in the Radio Access Network (Ran); Stage 2" (3GPP TS 25.346 version 7.4.0 Release 7); ETSI TS 125 346 No. V7.4.0 (Jun. 2007), IEEE, Lis, Sophia Antipolis Cedex, France, vol. 3-R2, No. V7.4.0, Jun. 1, 2007.

\* cited by examiner

METHOD AND A SYSTEM FOR TIME SYNCHRONISATION BETWEEN A CONTROL CENTRE AND SEVERAL TRANSMITTERS

BACKGROUND OF THE INVENTION

1. Field of the Invention

The invention relates to a method and a system for time synchronisation between a control centre and several transmitters, in particular, in a single frequency network.

2. Related Art

Within a single frequency network, as shown FIG. 1 for the operational case of two transmitters $2_1$ and $2_2$, the information to be transmitted is typically bundled by a control centre 1, also referred to as the headend, in an MPEG-2-coded manner in individual data packets of a transport data stream $s_{Zen}$ and supplied via a network to the individual, locally distributed transmitters $2_1, 2_2, \ldots, 2_i$ of the single frequency network. The transmission of the transport data stream $s_{TR1}, s_{TR2}, \ldots, s_{TRi}$ by the individual transmitters $2_1, 2_2, \ldots, 2_i$ of a single frequency network is implemented both in a frequency synchronised manner and also in a time synchronised manner.

The time synchronisation to be considered in the following description considers, in particular, different delay times $t_{TR1}, t_{TR2}, \ldots, t_{TRi}$ of the transport data stream $s_{Zen}$ between the control centre 1 and the individual transmitters $2_1, 2_2, \ldots, 2_i$. In WO 2006/046107 A1, a system and a method are presented for the time synchronisation of a transport data stream within a single frequency network, in which the synchronisation between the individual transmitters is implemented via time information, inserted into the transport data stream by the control centre in constant time intervals, which contain the transmission time of the data packet carrying the time information of the $t_{Sende_1}=t_{Sende_2}=\ldots=t_{Sende_i}$ of the data packet carrying the time information of the transport data stream $s_{TR1}, s_{TR2}, \ldots, s_{TRi}$ to be transmitted in all transmitters $2_1, 2_2, \ldots, 2_i$. On the basis of this time information, the individual transmitter can delay the individual received data packets of the transport data stream $s_{TR1}, s_{TR2}, \ldots, s_{TRi}$ continuously in time within the time raster of the transmitted time information by buffering them in a buffer memory $3_1, 3_2, \ldots, 3_i$ until every individual data packet can be transmitted at its correct transmission time $t_{Sende_i}=t_{Sende_2}=\ldots=t_{Sende_i}$.

BRIEF DESCRIPTION OF THE INVENTION

The transmission of the individual time information from the control centre to the individual transmitters within a constant time raster presupposes a transmission of the transport data stream with a constant data rate, because otherwise the time information, which is bound to cyclical data packets in a constant cycle of data packets, arrives at the transmitters in each case in time-variable time intervals corresponding to the time-variable data rate. The generation of the data rate of the transport data stream is implemented within a single frequency network on the basis of a reference time signal supplied to the control centre. Since, for reasons of cost, as can be seen from FIGS. 2 and 7, the control centre is not provided with a reference time signal $s_{Ref1}$ with a high time accuracy—for example, the Global Positioning System Time or the Universal Coordinated Time, but rather, a second reference time signal $s_{Ref2}$ with low time accuracy in the short time horizon and with high time accuracy in the long time horizon, derived from a first reference signal $s_{Ref1}$ with high time accuracy, is provided, a low frequency accuracy corresponding to the low time accuracy of the second reference time signal $s_{Ref2}$ is obtained for the data rate $f_{VAR}$ of the transport data stream in the short time horizon instead of a constant reference data rate $f_{REF}$ as shown in FIG. 3.

The object of the invention is therefore to develop further a method and a system for time synchronisation between a control centre and several transmitters within a single frequency network in such a manner that even in the case of a low frequency accuracy of the generated data rate of the transport data stream, a time synchronous transmission of the individual data packets of the transport data stream is guaranteed in all transmitters.

The object of the invention is achieved by a method for time synchronisation between a control centre and several transmitters and by a system for time synchronisation between a control centre and several transmitters.

The invention exploits the fact that, in the case of a second reference time signal supplied to the control centre with a low time and frequency accuracy in the short time horizon and a high time and frequency accuracy in the long time horizon, and in the case of a time variable data rate of the transport data stream corresponding to the time variable frequency of the second reference signal in the short time horizon, the time accuracy of the transmission times to be determined for individual data packets in the transport data stream, which are to be referenced to the second reference time signal, is increased by time averaging of the time and frequency accuracy of the second reference time signal.

The time averaging of the time and frequency accuracy of the second reference time signal is implemented, in a first variant, by time averaging of the frequency of the second reference time signal, which is time variable in the short time horizon.

In a second variant, the time averaging of the time and frequency accuracy of the second reference time signal is implemented by summation of the already transmitted data packets and subsequent weighting with the reference data rate corresponding to the frequency of the first reference time signal.

The determination of the transmission time associated with individual data packets of the transport data stream is implemented with regard to the second reference time signal, of which the time and frequency accuracy is increased by time averaging of the time and frequency accuracy of the second reference time signal. The transmission times consequently provide a high time accuracy.

The transport data stream received from the respective transmitter is time delayed in the respective transmitter until the data packet provided with a transmission time can be transmitted with a high time accuracy at the correct transmission time with regard to a first reference time signal supplied to every transmitter.

With regard to the selection of the data packets provided in each case with a transmission time, the following two embodiments of the invention can be specified.

In a first embodiment according to the invention, the individual time intervals between two successive data packets, which each contain an associated transmission time, are held constant. Because of the data rate, which is time variable in the short time horizon, the number of data packets between two successive data packets, which each contain an associated transmission time, is variable. Accordingly, a buffer, in which the individual data packets are buffered until their transmission time and are therefore time delayed, must be provided in each of the individual transmitters. In this context, the transmission data rate is constant for all transmitters.

In a second embodiment of the invention, the number of data packets in each case between two successive data packets, which each contain an associated transmission time, is held constant. The transmission data rate for all transmitters is time variable corresponding to the time-variable data rates of the transport data stream from the control centre to the transmitters.

The transmission time, which is stored in individual data packets of the transport data stream, can be an absolute time datum referenced to the first or second reference time signal or a relative time datum.

In order to prevent a drift of the data rate of the transport data stream from the constant frequency of the first reference time signal in the relatively longer time horizon, the data rate of the transport data stream is adjusted in a feedback controller for data-rate control within the control centre to a reference data rate corresponding to the frequency of the first reference time signal.

BRIEF DESCRIPTION OF THE DRAWINGS

The two embodiments of the method according to the invention and of the system according to the invention for time synchronisation between a control centre and several transmitters in a single frequency network are explained in detail below with reference to the drawings. The drawings are as follows.

DETAILED DESCRIPTION

Figure 7:
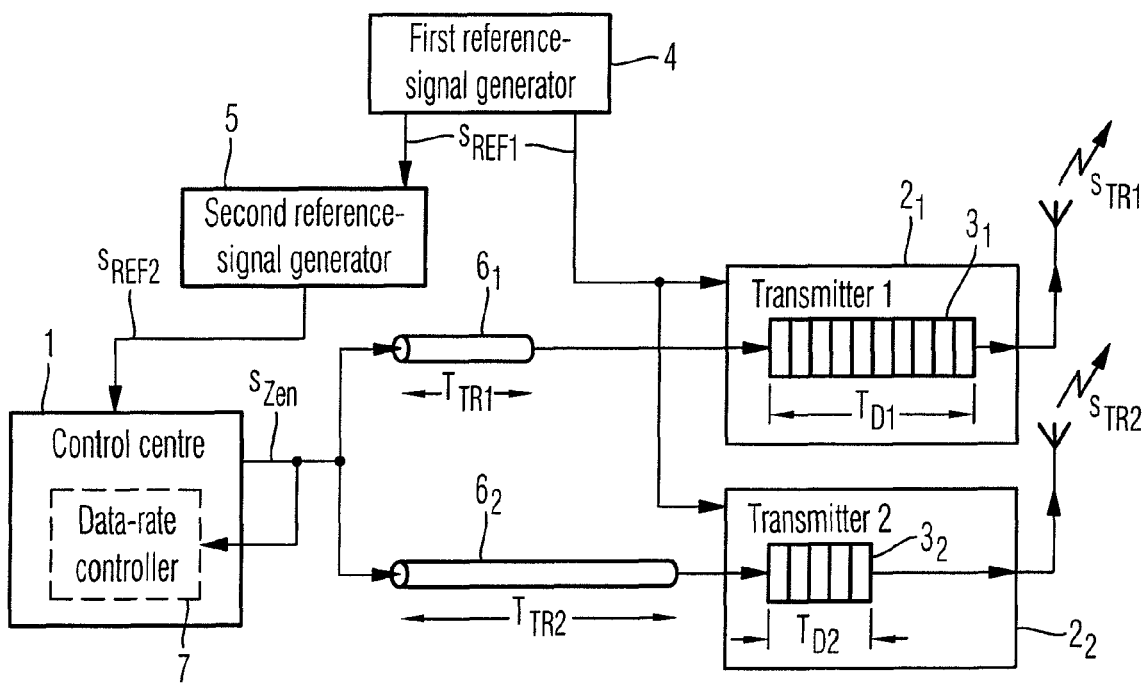
FIG. 7 shows a block diagram of the system according to the invention for time synchronisation between a control centre and several transmitters within a single frequency network.

In the following section, the system according to the invention for time synchronisation between a control centre and several transmitters within a single frequency network is described with reference to the block diagram in FIG. 7.

Figure 2:
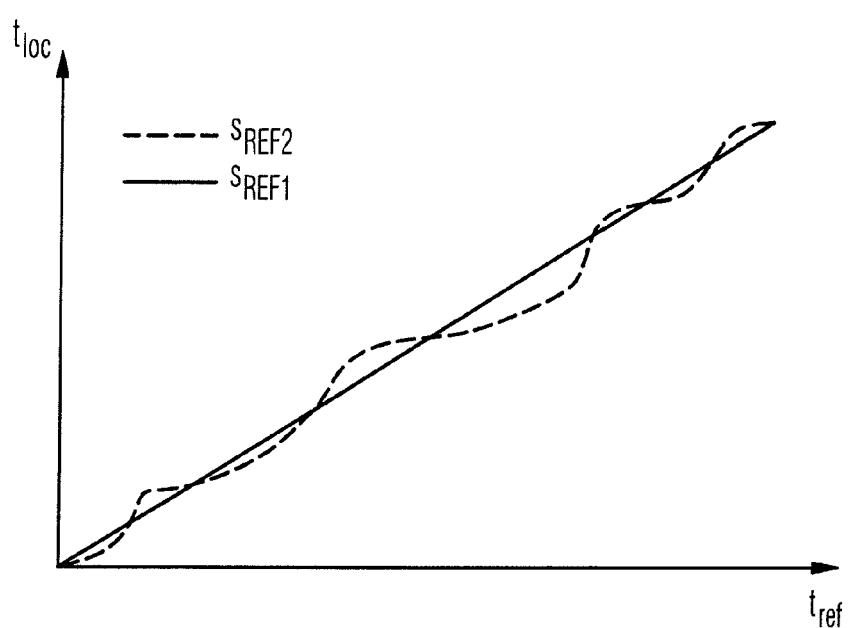
FIG. 2 shows a time-flow diagram with the characteristic of the first and second reference time signal.
Figure 3:
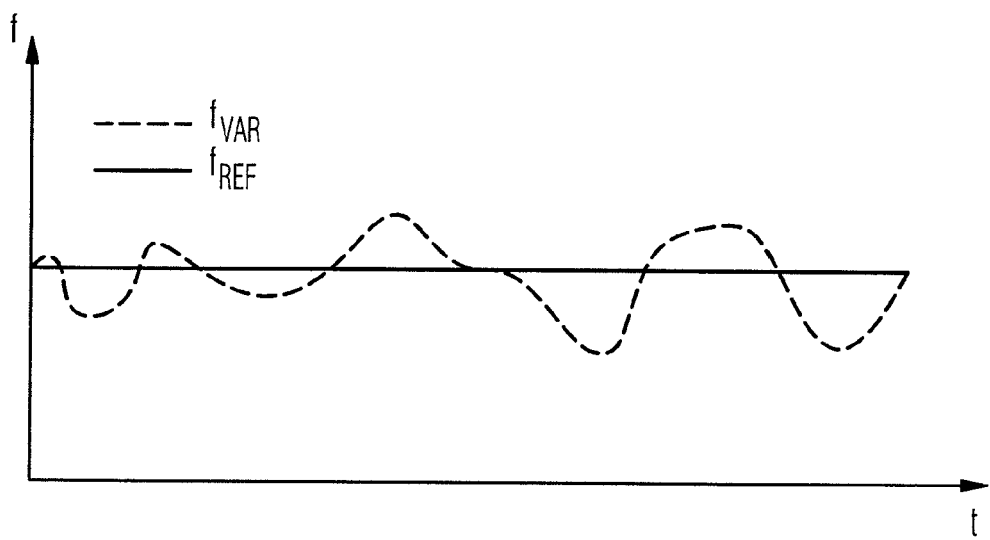
FIG. 3 shows a time-flow diagram with the characteristic of a time variable data rate and a constant reference data rate of the transport data stream.

In a first reference signal generator 4, a first reference signal $s_{REF1}$ is generated with a high time accuracy as shown in FIG. 2 (continuous line) and with a reference frequency $f_{REF}$ of high frequency accuracy according to FIG. 3 (continuous line). In this context, either, for example, the Global Position System time or the Universal Coordinated Time or an equivalent standardised system time of high time accuracy and, at the same time, of high frequency accuracy is used. From this first reference time signal $s_{REF1}$, in a second reference signal generator 5, a second reference time signal $s_{REF2}$ is generated with a relatively lower time accuracy in the short time horizon by comparison with the time accuracy of the first reference time signal $s_{REF1}$, and an equivalent time accuracy in the long time horizon relative to the time accuracy of the first reference time signal $s_{REF1}$ according to FIG. 2 (dotted line), and with a time-variable frequency $f_{VAR}$ with a relatively lower frequency accuracy as shown in FIG. 3 (dotted line) by comparison with the reference frequency of the first reference time signal $s_{REF1}$.

The reference signal is therefore a signal whose time fluctuates by comparison with the time of a reference signal with a relatively higher accuracy, is ahead or behind in comparison with the time of a reference time signal with relatively higher accuracy, and of which the time resolution is relatively coarse, so that the momentary time cannot be read out in an arbitrarily accurate manner. In the case of the second reference time signal $s_{REF2}$, this can, for example, be the Network Time Protocol used within a network, in which the relatively lower time and frequency accuracy is caused by stochastic packet delay time within a network, and the temperature-dependent drift of the synchronised local oscillator in the connected receiver.

On the basis of the second reference time signal $s_{REF2}$ and the preferably MPEG-2-coded data to be transmitted, a transport data stream $s_{Zen}$, with individual data packets is generated in the control centre. Because of the relatively low frequency accuracy in the short time horizon, this transport data stream provides a time-variable data rate in the short time horizon and an approximately constant data rate in the long time horizon. In order to prevent a drift of the data rate of the transport data stream $s_{Zen}$, in the long time horizon, a controller 7 is provided in the control centre 1 for data-rate control, which identifies a drift of the data rate of the transport data stream $s_{Zen}$ in the long time horizon and adjusts the data rate of the transport data stream $s_{Zen}$ to the reference data rate corresponding to the constant frequency of the first reference time signal.

On the basis of the relatively low time accuracy in the short time horizon, the individual data packets additionally provide a certain positive or negative time offset—time offset $t_{OFF}$— relative to the time of the first reference time signal $s_{REF1}$.

In order to synchronise all transmitters $2_1, 2_2, \ldots, 2_i$ with one another, the transmission time $t_{Sende_1} = t_{Sende_2} = \ldots = t_{Sende_i}$ associated with the respective data packet common to all transmitters $2_1, 2_2, \ldots, 2_i$ is added. In the extreme case, each data packet of the transport data stream contains its own associated, transmission time. For reasons of practicability, in order to achieve a given transmission efficiency, an associated transmission time is added in each case only to those data packets of the transport data stream, which are transmitted within a given time interval relative to one another or after a given number of data packets.

The transmission time investigated for such data packets of the transport data stream is determined on the basis of the relatively lower time accuracy of the second reference time signal by comparison with the first reference time signal. In order to increase the time accuracy in determining the respective transmission time through time averaging of the time and frequency accuracy of the second reference time signal with its relatively lower time accuracy in the short time horizon with increasing time, an approximation of the averaged second reference time signal to the first reference time signal with its high time accuracy is achieved.

Figure 1:
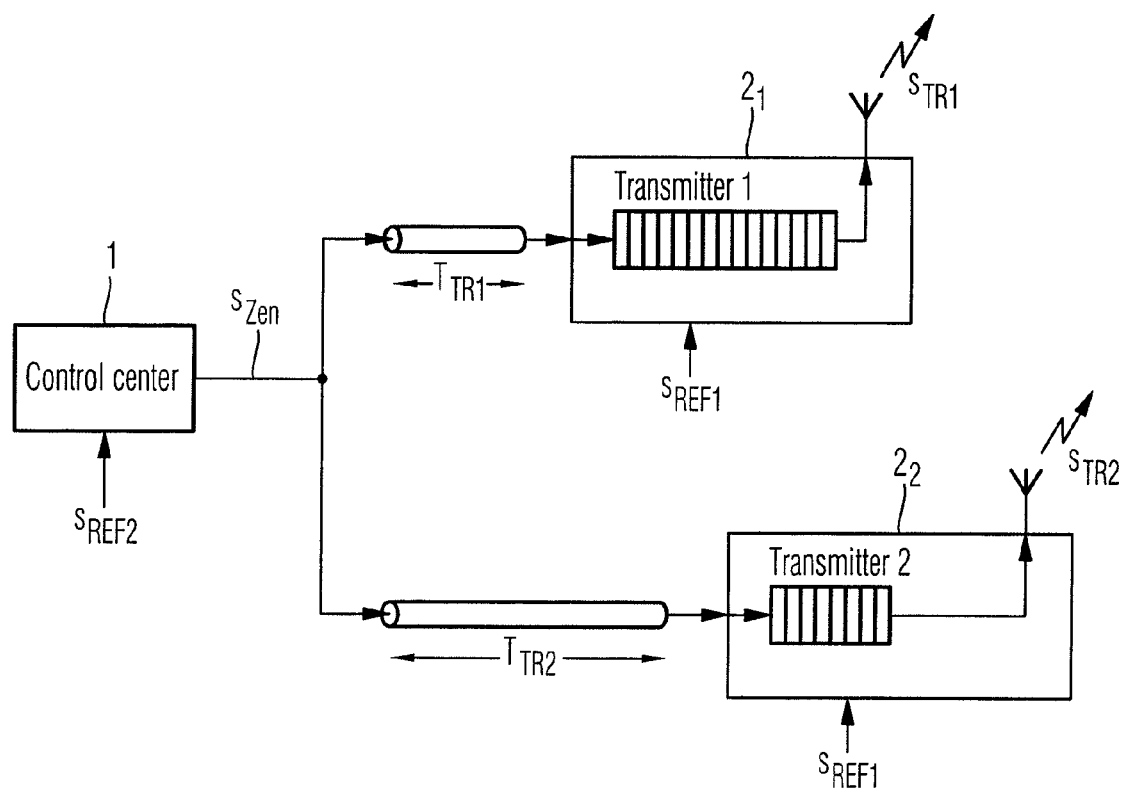
FIG. 1 shows a block diagram of a system for time synchronisation between a control centre and several transmitters within a single frequency network.

The time averaging of the time and frequency accuracy of the second reference time signal $s_{REF2}$, which, according to FIG. 3, is a frequency signal with a time-variable frequency, can be implemented in a first variant, by determination of the time-variable frequency characteristic $f_{VAR}(i \cdot \Delta t)$ according to FIG. 1, within an appropriately selected time raster $\Delta t$ and subsequent averaging of this determined frequency characteristic $f_{VAR}(i \cdot \Delta t)$ according to equation (1). The averaging process brings about an approximation of the time-variable frequency characteristic $f_{VAR}(i \cdot \Delta t)$ to the constant reference frequency characteristic $f_{REF}$ with increasing time. The averaging of the time-variable frequency characteristic $f_{VAR}(i \cdot \Delta t)$ generates a time-averaged second reference time signal $s_{REF2}$ according to equation (2).

$$\bar{f}_{VAR}(\tau \cdot \Delta t) = \frac{\sum_{i=0}^{\tau} f_{VAR}(i \cdot \Delta t) \cdot \Delta t}{\tau \cdot \Delta t} \quad (1)$$

$$\bar{s}_{REF2} = s_{REF2}(\bar{f}_{REF2}) \quad (2)$$

Alternatively, in a second variant, the time averaging of the time and frequency accuracy of the second reference time signal $\bar{s}_{REF2}$ can be implemented by summation of the data packets n(i) to be transmitted up to the respective transmission time $t_{Sende}$ and subsequent weighting with the reference data rate $f_{REF}$ according to equation (3).

$$\bar{s}_{REF2}(t_{Sende}) = \frac{\sum_{i=0}^{t_{Sende}} n(i)}{f_{REF}} \quad (3)$$

The transmission time $t_{Sende}$ of the respective data packet $n(t_{Sende})$ in the transport data stream, which carries a time information of this kind, is determined on the basis of the accordingly determined, time-averaged second reference time signal $\bar{s}_{REF2}$.

Figure 4A:
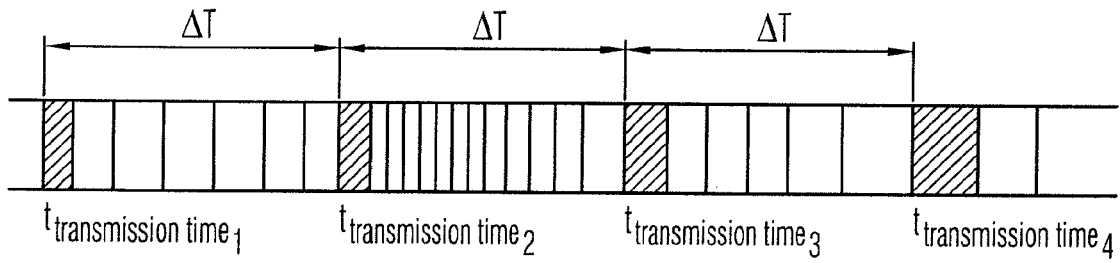
FIGS. 4A and 4B show a transport data stream with data packets of a first and second embodiment according to the invention containing transmission times.
Figure 4B:
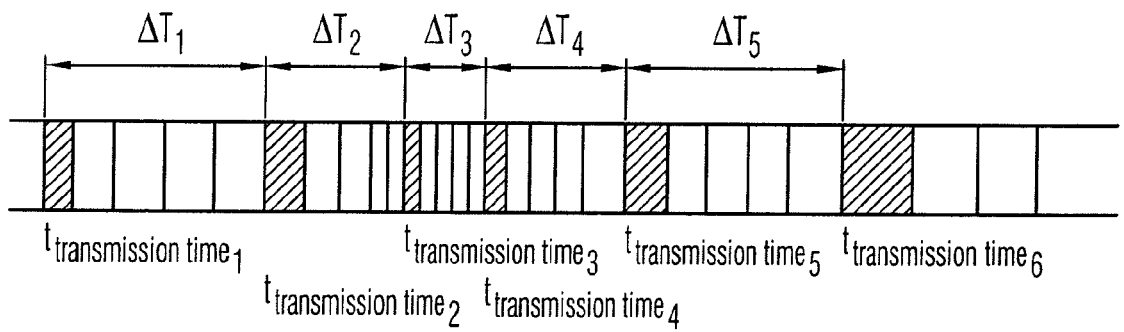

For this purpose, two embodiments are obtained according to FIGS. 4A and 4B.

In the first embodiment according to the invention as shown in FIG. 4A, those data packets n(i) in the transport data stream to be transmitted are selected and provided with the associated transmission time $t_{Sende_i}$ (shaded areas in FIG. 4A), of which the transmission times $t_{Sende_i}$ are spaced in each case relative to one another in time at equidistant time intervals $\Delta t$ at a given time-variable frequency $f_{VAR}$ of the second reference time signal $s_{REF2}$. Since the number of data packets of the transport data stream to be transmitted varies within the individual time intervals $\Delta t$, the individual data packets should be buffered as required in the individual transmitters, in order to guarantee a transmission of all data packets of the transport data stream—also those data packets, which contain no time information providing the respective transmission time (non-shaded areas in FIG. 4A)—with a constant transmission data rate.

In the second embodiment according to the invention shown in FIG. 4B, those data packets n(i) in the transport data stream to be transmitted are selected and provided with the associated transmission time $t_{Sende_i}$, which are to be transmitted in each case according to a cycle of data packets each with a constant, previously appropriately specified number of data packets. On the basis of the time-variable frequency $f_{VAR}$ of the second reference time signal $s_{REF2}$ the data packets n(i) provided in each case with a transmission time $t_{Sende_i}$ are provided in non-equidistant time intervals $\Delta t_1$, $\Delta t_2$, $\Delta t_3$, $\Delta t_4$ etc. The transmission of the individual data packets of the transport data stream in each transmitter $2_1, 2_2, \ldots, 2_i$ is consequently implemented with a non-constant data rate. An intermediate buffering of individual data packets in the individual transmitters $2_1, 2_2, \ldots, 2_i$ for the purpose of achieving a constant transmission data rate is consequently not required.

A transport data stream $s_{Zen}$ generated in this manner by the control centre 1, which also contains data packets n(i) with associated transmission times $t_{Sende_i}$, is transmitted from the control centre to the individual transmitters $2_1, 2_2, \ldots, 2_i$ via associated connecting paths $6_1, 6_2, \ldots, 6_i$. In each case, the individual transmission paths $6_1, 6_2, \ldots, 6_i$ provide a different distance, at which the transport data stream $s_{Zen}$ generated by the control centre 1, experiences a different delay $t_{TR1}$, $t_{TR2}, \ldots, t_{TRi}$.

A data packet n(i) of the transport data stream $s_{Zen}$ received from the transmitter $2_i$, which is transmitted by the transmitter $2_i$ at the transmission time $t_{Sende_i}$, must be buffered in a buffer memory $3_i$ associated with the transmitter $2_i$, in order to time-bridge the time interval between the time $t_G$ of the generation of the data packet n(i), which is determined with the time accuracy of the second reference time signal $s_{REF2}$ supplied to the control centre 1, and the time $t_{Sende_i}$ of the transmission of the data packet n(i) by the transmitter $2_i$, which is determined with the time accuracy of the first reference time signal $s_{REF1}$ supplied respectively to all transmitters $2_1$, $2_2, \ldots, 2_i$. For the determination of the delay time $t_{Di}$, within which the respective data packet n(i) is buffered in the buffer memory $3_i$ in order to bridge this time interval, according to equation (4), the delay time $t_{TRi}$ of the transmission path $6_i$ and the time offset $t_{OFF}$ between the relatively lower time accuracy of the second reference time signal relative to the relatively higher time accuracy of the first reference time signal is taken into consideration.

$$t_{Di} = t_{Sende_i} - t_G - t_{TRi} - t_{OFF} \quad (4)$$

A received data packet n(i), which is buffered in the buffer memory $3_i$ of the transmitter $2_i$ over the period of the delay time $t_{Di}$, is time delayed by the delay time $t_{Di}$, so that it is transmitted at the transmission time $t_{Sende_i}$ by the transmitter $2_i$ within the frame of the transport data stream $s_{TRi}$ to be transmitted.

If the intermediate buffering of the individual received data packets n(i) is implemented in an equivalent manner by all transmitters $2_1, 2_2, \ldots, 2_i$ according to equation (4), the identical data packet n(i) can be transmitted by all transmitters $2_1, 2_2, \ldots, 2_i$ in a time synchronous manner at the identical transmission time $t_{Sende_1} = t_{Sende_2} = \ldots = t_{Sende_i}$ in all transport data streams $s_{TR1} = s_{TR2} = \ldots = s_{TRi}$ to be transmitted.

Figure 5A:
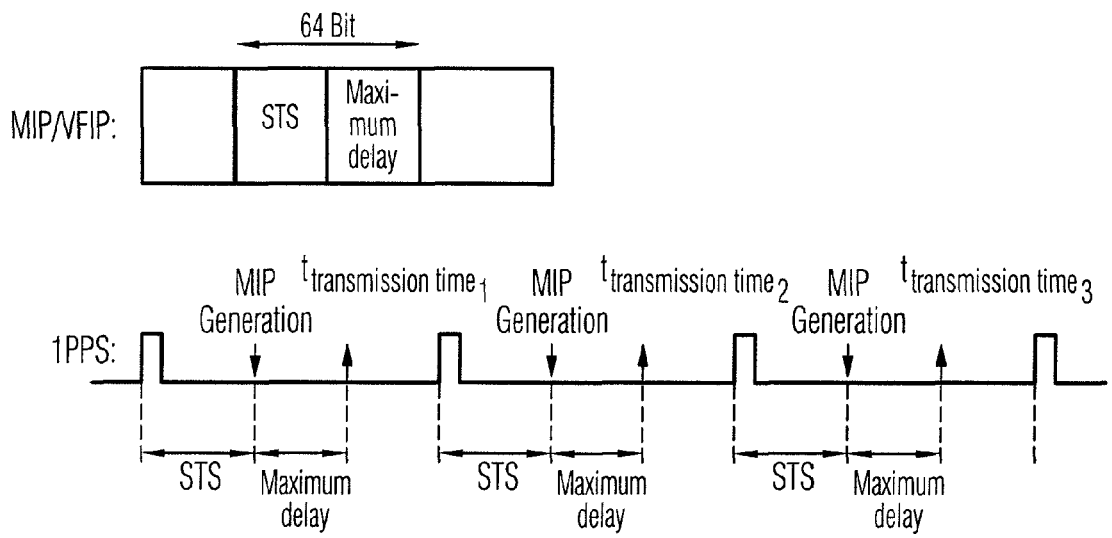
FIG. 5A, 5B show a structure of a data packet with relative and absolute transmission time and associated time diagram with determination of the transmission time on the basis of a first or second reference time signal.

The transmission time $t_{Sende_i}$ of the data packet n(i) in the transmitter $2_i$ can be indicated according to FIG. 5A as a relative time-datum reference to the first reference time signal $s_{REF1}$. For this purpose, in a so-called MIP or VFIP data packet, the transmission time $t_{Sende_i}$ of the MIP or VFIP data packet is determined as the sum of a synchronisation time stamp (Sync Timestamp (STS)), which is referenced to the last received 1PPS pulse of the first reference time signal $s_{REF1}$ realised as a 1-pulse-per-second (1PPS) signal, and the maximal delay time of all delay times $t_{TR1}, t_{TR2}, \ldots, t_{TRi}$ between the control centre 1 and each of the transmitters $2_1$, $2_2, \ldots, 2_i$. Through this type of referencing of the transmission time $t_{Sende_i}$ of the data packet n(i) relative to the last received pulse of the 1PPS signal, the generally unknown delay times $t_{TR1}, t_{TR2}, \ldots, t_{TRi}$ between the control centre 1 and all transmitters $2_1, 2_2, \ldots, 2_i$ need not be investigated in order to determine the transmission time $t_{Sende_i}$ of the data packet n(i). Conversely, the maximum delay time of all delay times $t_{TR1}, t_{TR2}, \ldots, t_{TRi}$ must not be greater than one second, because otherwise, an unambiguous referencing of the transmission time $t_{Sende_i}$ of the data packet n(i) to the 1PPS signal is not possible. Furthermore, it is not possible to calculate in advance transmission times $t_{Sende_i}$ of the respective MIP and/or VFIP data packet disposed at any distance in the future.

Figure 5B:
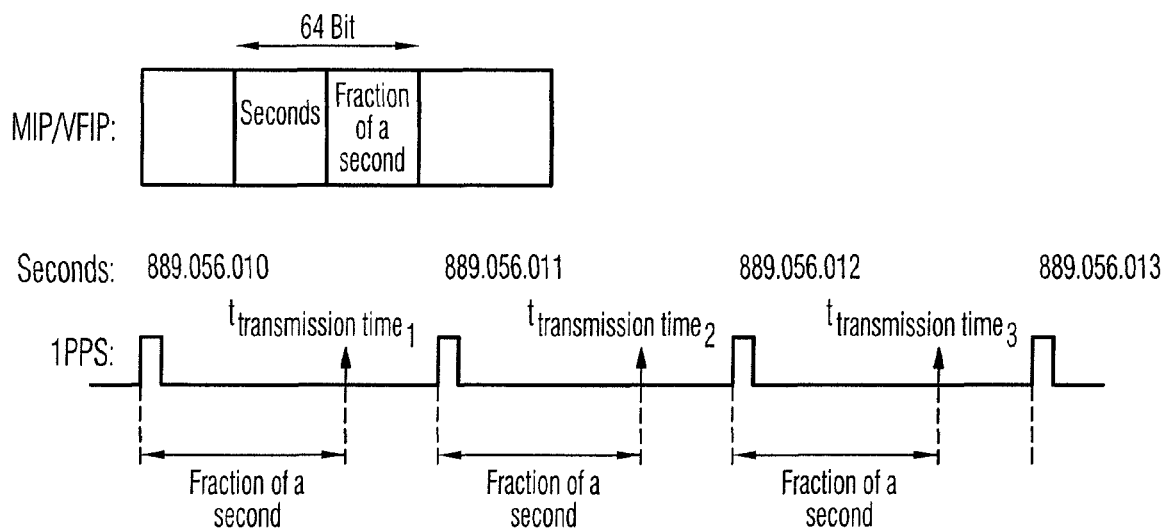

The transmission time $t_{Sende_i}$ of the data packet n(i) in the transmitter $2_i$ can also be indicated according to FIG. 5B as an absolute time datum referenced to the first reference time signal $s_{REF1}$. For this purpose, the MIP or VFIP data packet contains the transmission time $t_{Sende_i}$ of the MIP or VFIP data packet as an elapsed GPS second of the last received 1PPS pulse since the start of a GPS reference time—typically within a given GPS week or within a given GPS year—with the addition of a GPS fraction of a second. In this manner, it is possible to calculate transmission times $t_{Sende_i}$ of the respective MIP or VFIP data packet disposed at any distance in the future in advance and to permit arbitrarily large delay times of the individual transmission paths.

The use of a relative or absolute time datum for the transmission time $t_{Sende_i}$ of the data packet n(i) in the transmitter $2_i$ need not relate to the GPS time. Other standardised reference time sources, for example, the Universal Coordinated Time (UTC), are also covered by the invention.

Figure 6:
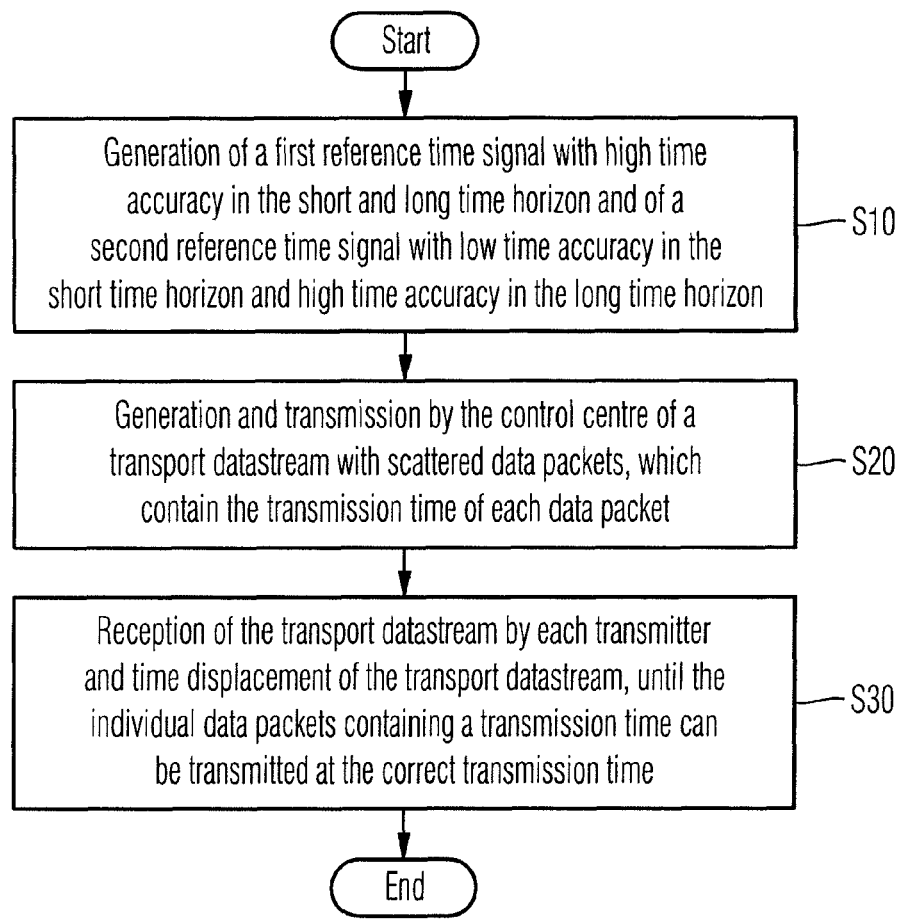
FIG. 6 shows a flow diagram of a method according to the invention for time synchronisation between a control centre and several transmitters within a single frequency network.

In the flow diagram of FIG. 6, the method according to the invention for time synchronisation between a control centre 1 and several transmitters $2_1, 2_2, \ldots, 2_i$ is presented.

In a first method step S10, within a first reference signal generator 4, a first reference signal $s_{REF1}$ is generated with a high time and frequency accuracy in the short and long time horizon, that is to say, for example, a 1PPS signal associated with a GPS signal or 10 MHz signal or a UTC signal. As an alternative, the signal can also be received from an external signal source. From this first reference time signal $s_{REF1}$, in a second reference signal generator 5, the generation of a second reference time signal $s_{REF2}$ is implemented with a relatively lower time and frequency accuracy by comparison with the high time and frequency accuracy of the first reference time signal $s_{REF1}$ in the short time horizon, and a high time and frequency accuracy in the long time horizon. This can be, for example, the NTP Time protocol used in the Internet. As an alternative, the signal can also be received from an external signal source.

In the next method step S20, within the control centre 1, the generation of a transport data stream $s_{Zen}$ supplied to the individual transmitters $2_1, 2_2, \ldots, 2_i$ with individual data packets, which contain the typically MPEG-2-coded information to be transmitted, is implemented. The second reference time signal $s_{REF2}$ is used as the time and frequency reference of the transport data stream $s_{Zen}$. The data rate of the transport data stream $s_{Zen}$ generated by the control centre 1 corresponds to the frequency of the second reference time signal $s_{REF2}$ with its comparatively low frequency accuracy in the short time horizon and high frequency accuracy in the long time horizon. In order to prevent a drifting of the data rate of the transport data stream in the long time horizon, the data rate of the transport data stream in the control centre is controlled to the reference data rate corresponding to the frequency of the first reference time signal $s_{REF2}$ with high frequency accuracy in the short and long time horizon.

In a similar manner, the individual data packets are synchronised in time within the generated transport data stream $s_{Zen}$ with the second reference time signal $s_{REF2}$. The transmission times $t_{Sende_i}$ of the data packets n(i) provided with an associated transmission time $t_{Sende_i}$ are also determined with time reference to the second reference time signal $s_{REF2}$, wherein either a relative time datum according to FIG. 5A or an absolute time datum according to FIG. 5B is used.

The time accuracy of the transmission times $t_{Sende_i}$ of the data packets n(i) provided with an associated transmission time $t_{Sende_i}$ is either increased by averaging the frequency characteristic of the second reference time signal $s_{REF2}$ according to equation (1) or by summation of the data packets to be transmitted up to the transmission time $t_{Sende_i}$ and subsequent weighting with the frequency-accurate frequency of the first reference time signal $s_{REF1}$ used as the reference frequency $f_{REF}$ as shown in equation (3) according to the invention.

The choice of the data packets n(i) provided with a transmission time $t_{Sende_i}$ within the transport data stream $s_{Zen}$ generated by the control centre 1 can be implemented either according to FIG. 4A in a cyclical manner in a constant time raster $\Delta t$ or according to FIG. 4B in a cyclical manner in a raster with a constant number of data packets, which contain no transmission time $t_{Sende_i}$, respectively between data packets n(i) provided with a transmission time $t_{Sende_i}$.

In the final method step S30, the transport data stream $s_{Zen}$ generated by the control centre 1 and transmitted via the individual transmission paths $6_1, 6_2, \ldots, 6_i$ to the individual transmitters $2_1, 2_2, \ldots, 2_i$ is received by the respective transmitter $2_1, 2_2, \ldots, 2_i$ and time delayed through buffering in the respectively allocated buffer memory $3_1, 3_2, \ldots, 3_i$ over a delay time $t_{D1}, t_{D2}, \ldots, t_{Di}$ calculated according to equation (4), so that the data packet n(i) of the received transport data stream $s_{Zen}$ provided with the transmission time $t_{Sende_i}$ is transmitted by all transmitters $2_1, 2_2, \ldots, 2_i$ in a time synchronous manner at the identical transmission time $t_{Sende_i}$. In a similar manner, through the process of buffering in the buffer memories $3_1, 3_2, \ldots, 3_i$ associated in each case with the individual transmitters $2_1, 2_2, \ldots, 2_i$, the data packets transmitted between the data packets n(i) provided in each case with a transmission time $t_{Sende_i}$ in the transport data stream are transmitted at their associated transmission times in each case by all transmitters $2_1, 2_2, \ldots, 2_i$ in a time synchronous manner.

The invention is not restricted to the exemplary embodiments and variants of the method according to the invention and the system according to the invention for time synchronisation between a control centre and several transmitters in a single frequency network as presented. The time synchronisation between a control centre and several transmitters in a multi frequency network is also covered by the invention, in which several transmitters are partially coupled to form a single frequency network and transmit the same transmission content synchronously in an cross-regional manner within a single frequency network mode, while, regionally, in a multi frequency network mode, each transmitter transmits a respectively different transmission content in an asynchronous manner.

The invention claimed is:

1. A method of time synchronisation between a control centre and a plurality of transmitters in a single frequency network, comprising the steps of:

at least one of generating, by one or more signal generators, and receiving, by the control centre, a first reference time signal with a high time and frequency accuracy in a short and long time horizon and a second reference time signal supplied to the control centre with a low time and frequency accuracy in the short time horizon and a high time and frequency accuracy in the long time horizon;

generating a transport data stream to be supplied to the plurality of transmitters with a time-variable data rate through the control centre corresponding to a frequency of the second reference time signal, wherein data packets containing a transmission time of a data packet referenced to the first reference time signal in the transmitters are distributed within the transport data stream, and wherein a time accuracy of a transmission time of the respective data packet is optimised by time averaging of the time and frequency accuracy of the second reference time signal, wherein the time averaging of the time and frequency accuracy of the second reference time signal is implemented by summing the transmitted data packets and weighting with a reference data rate corresponding to the frequency of the first reference time signal; and performing time displacement of the transport data stream received from the control centre by a respective one of the plurality of transmitters until the data packets of the transport data stream each containing a transmission time are transmitted, with regard to the first reference time signal supplied to the respective transmitter, at a correct transmission time.

2. A method of time synchronisation between a control centre and a plurality of transmitters in a single frequency network, comprising the steps of:

at least one of generating, by one or more signal generators, and receiving, by the control centre, a first reference time signal with a high time and frequency accuracy in a short and long time horizon and a second reference time signal supplied to the control centre with a low time and frequency accuracy in the short time horizon and a high time and frequency accuracy in the long time horizon;

generating a transport data stream to be supplied to the plurality of transmitters with a time-variable data rate through the control centre corresponding to a frequency of the second reference time signal, wherein data packets containing a transmission time of a data packet referenced to the first reference time signal in the transmitters are distributed within the transport data stream, and wherein a time accuracy of a transmission time of the respective data packet is optimised by time averaging of the time and frequency accuracy of the second reference time signal, wherein the time averaging of the time and frequency accuracy of the second reference time signal is implemented through time averaging of the time-variable frequency of the second reference time signal; and performing time displacement of the trans ort data stream received from the control centre by a respective one of the plurality of transmitters until the data packets of the transport data stream each containing a transmission time are transmitted, with regard to the first reference time signal supplied to the respective transmitter, at a correct transmission time.

3. The method of time synchronisation according to any one of claims 1 to 2, wherein a time interval between two successive transmission times of data packets each containing a transmission time is constant, and the transport data stream within the time interval contains a number of data packets dependent upon a data rate present in the respective time interval.

4. The method of time synchronisation according to claim 3, wherein data packets received in the respective transmitter before the transmission time of each data packet, correspondingly, are buffered in a buffer of the respective transmitter and accordingly time delayed.

5. The method of time synchronisation according to any one of claims 1 to 2, wherein a time interval between two successive transmission times of data packets each containing a transmission time is time variable, and the transport data stream in every time interval contains in each case a constant number of data packets.

6. The method of time synchronisation according to any one of claims 1 to 2, wherein the transmission time is an absolute time datum referenced to the first or second reference time signal.

7. The method of time synchronisation according to any one of claims 1 to 2, wherein the transmission time is a relative time datum referenced to the first or second reference time signal.

8. The method of time synchronisation according to claim 1, wherein in order to achieve a high frequency accuracy of the data rate of the transport data stream generated in the control centre in the long time horizon, the data rate of the transport data stream is regulated to the reference data rate.

9. A system for time synchronisation between a control centre and a plurality of transmitters within a single frequency network, comprising:

a first reference signal generator operable to generate a first reference time signal with a high time and frequency accuracy in a short and long time horizon;

a second reference signal generator connected to the first reference signal generator operable to generate a second reference time signal with a low time and frequency accuracy in the short time horizon and a high time and frequency accuracy in the long time horizon;

a control centre connected to the second reference signal generator for the generation of a transport data stream supplied to several transmitters with a data rate corresponding to a frequency of the second reference time signal, wherein data packets with transmission times referenced to the second reference time signal in the transmitters are distributed within the transport data stream, wherein the time accuracy of the transmission times is optimised by time averaging of the time accuracy of the second reference time signal, wherein the time averaging of the time and frequency accuracy of the second reference time signal is implemented by summing the previously transmitted data packets and weighting with a reference data rate corresponding to the frequency of the first reference time signal, and wherein the transport data stream received from the control centre by the plurality of transmitters are time displaced until the data packets of the transport data stream each containing a transmission time with regard to the first reference time signal supplied in each case to the transmitters are transmitted at the correct transmission time.

10. A system for time synchronisation between a control centre and a plurality of transmitters within a single frequency network, comprising:

a first reference signal generator operable to generate a first reference time signal with a high time and frequency accuracy in a short and long time horizon;

a second reference signal generator connected to the reference signal generator operable to generate a second reference time signal with a low time and frequency accuracy in the short time horizon and a high time and frequency accuracy in the long time horizon;

a control centre connected to the second reference signal generator for the generation of a transport data stream supplied to several transmitters with a data rate corresponding to a frequency of the second reference time signal, wherein data packets with transmission times referenced to the second reference time signal in the transmitters are distributed within the transport data stream, wherein the time accuracy of the transmission times is optimised by time averaging of the time accuracy of the second reference time signal, wherein the time averaging of the time and frequency accuracy of the second reference time signal is implemented through time averaging of the time-variable frequency of the second reference time signal, and wherein the transport data stream received from the control centre by the plurality of transmitters are time displaced until the data packets of the transport data stream each containing a transmission time with regard to the first reference time signal supplied in each case to the transmitters are transmitted at the correct transmission time.

11. The method of time synchronisation according to claim 2, wherein in order to achieve a high frequency accuracy of the data rate of the transport data stream generated in the control centre in the long time horizon, the data rate of the transport data stream is regulated to a reference data rate.

* * * * *

UNITED STATES PATENT AND TRADEMARK OFFICE
CERTIFICATE OF CORRECTION

PATENT NO. : 8,553,619 B2  
APPLICATION NO. : 13/002210  
DATED : October 8, 2013  
INVENTOR(S) : Norman Herzog et al.

Page 1 of 1

It is certified that error appears in the above-identified patent and that said Letters Patent is hereby corrected as shown below:

ON TITLE PAGE [56] REFERENCES CITED:

Under Lecture 4, page 3, "http://www.abo.fi/~jbjorkqv/digitv/lect4.pdt" should read --http://www.abo.fi/~jbjorkqv/digitv/lect4.pdf--.

IN THE CLAIMS:

COLUMN 9:

Line 43, "trans ort" should read --transport--.

Signed and Sealed this
Twenty-second Day of April, 2014

Michelle K. Lee
*Deputy Director of the United States Patent and Trademark Office*